United States Patent
Ho

(10) Patent No.: US 7,273,028 B1
(45) Date of Patent: Sep. 25, 2007

(54) NOISE SUPPRESSING MECHANISM FOR BALANCE GEAR OF ENGINE CRANKSHAFT

(75) Inventor: Chao-Chang Ho, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 11/377,183

(22) Filed: Mar. 17, 2006

(51) Int. Cl.
*F01L 1/02* (2006.01)
(52) U.S. Cl. .................................. 123/192.2
(58) Field of Classification Search ............. 123/192.2, 123/192.1
See application file for complete search history.

(56) References Cited

U.S. PATENT DOCUMENTS

| | | | | |
|---|---|---|---|---|
| 5,044,333 A | * | 9/1991 | Fuchigami et al. ...... | 123/192.2 |
| 6,109,227 A | * | 8/2000 | Mott ....................... | 123/90.31 |
| 6,234,127 B1 | * | 5/2001 | Simpson et al. ......... | 123/90.31 |

* cited by examiner

*Primary Examiner*—Stephen K. Cronin
*Assistant Examiner*—Jason Benton
(74) *Attorney, Agent, or Firm*—Leong C. Lei

(57) ABSTRACT

A noise suppressing mechanism for balance gear system of an engine crankshaft is disclosed. The balance gear system includes a primary gear, a secondary gear, and a torsional spring and is fit on a balance shaft. The noise suppressing mechanism includes a circular flange formed on the primary gear and the secondary gear forms a central bore rotatably fit over the circular flange for free rotation about the circular flange with respect to the primary gear. The torsional spring is arranged between the primary and secondary gears. The primary gear forming a securing hole in which a stem section of a limiting pin is received and fixed. The secondary gear forms a through hole in which a head section of the limiting pin is accommodated with a gap formed between the head section and an inside diameter of the through hole. The gap allows for a limited angular shift of the secondary gear with respect to the primary gear. Such an arrangement provides a noise suppressing mechanism having less number of parts and being ready to assemble.

6 Claims, 7 Drawing Sheets

NOISE SUPPRESSING MECHANISM FOR BALANCE GEAR OF ENGINE CRANKSHAFT

BACKGROUND OF THE INVENTION (a) Technical Field of the Invention

The present invention relates to a mechanism for suppressing noise caused by the operation of balance gear of an engine crankshaft, and in particular to a mechanism having less number of parts and being easy to assemble.

(b) Description of the Prior Art

FIG. 1 of the attached drawings shows an engine, which is broadly designated with reference numeral 1, and a transmission box 2 arranged at one side of the engine 1. A belt-based transmission mechanism 3 is encased in the transmission box 2. In operation, a mixture of fuel and air is fed into the engine 1 and an ignition device 11 ignites the mixture to cause combustion of the mixture inside a cylinder of the engine. The combustion results in expansion of gas inside the cylinder, which in turn drives a piston 12 to move reciprocally inside the cylinder. The piston 12 is coupled to a crankshaft 13, which extends into the transmission box 2 and is coupled to the transmission mechanism 3 to drive the transmission mechanism 3 for driving wheels of a vehicle on which the engine is mounted.

Also referring to FIG. 2, the piston 12 is coupled to the crankshaft 13 through a connecting rod 15 so that the movement of the piston 12 is converted into rotation of the crankshaft 13. A counterweight 16 is provided, in an eccentric manner, to the crankshaft 13 corresponding to the connecting rod 15. When the piston 12 is moved by the expansion of the combusted fuel-air mixture, the force acting on the piston 12 is transmitted to the counterweight 16 through the connecting rod 15, causing the crankshaft 13 to rotate about a rotational axis thereof. The counterweight 16, however, possesses a large inertial force, which induces vibration on the rotation of the crankshaft 13. To eliminate the vibration and maintain steady and stable rotation of the crankshaft 13, the engine 1 is provided with a balance shaft 4, which is coupled to the crankshaft 13 by having a drive gear 17 that is mounted on the crankshaft 13 mating a balance gear (driven gear) 41 mounted on the balance shaft 4. The drive gear 17 drives the driven gear 41 and thus causes the balance shaft 4 to rotate in unison with the crankshaft 13 for eliminating or compensating vibration caused by the inertial of the counterweight 16 of the crankshaft 13.

However, due to the manufacturing tolerance of the gears, backlash is present between teeth of the mated gears. Thus, noise is often generated when the drive gear 17 of the crankshaft 13 and the balance gear 41 of the balance shaft 4, which mate each other, are rotated in high speed during the operation of the engine 1.

FIG. 3 illustrates a solution for eliminating the gear noise caused by backlash, wherein the balance gear 4 is divided into two halves, one referred to as primary gear and designated with reference numeral 411, while the other secondary gear 412. The primary and secondary gears 411, 412 are arranged closely side by side. A torsional spring 42 is provided between the secondary gear 412 and a ring retainer 43 that is tightly fit over the balance shaft 4 and fixed in position by a pin 44 to maintain the secondary gear 412 close to the primary gear 411. The torsional spring 42 constantly induces an angular shift of the secondary gear 412 with respect to the primary gear 411 to eliminate the backlash between the drive gear 17 and the primary gear 411.

Further, the secondary gear 412 is allowed to take free rotation within a limited angular range so that when the drive gear 17 of the crankshaft 13 is to drive the balance gear 41 of the balance shaft 4, the drive gear 17 of the crankshaft 13 engages the secondary gear 412 first and the secondary gear 412, due to the elastic deformation of the torsional spring 42, is rotated a limited angular displacement about the balance shaft 4 until the teeth of the secondary gear 412 and the primary gear 411 completely align with each other. Thereafter, the drive gear 17 moves both the primary and secondary gears 411, 412 simultaneously to rotate the balance shaft 4.

This conventional mechanism, although effective in suppressing the noise caused by the gear backlash during the operation of the engine, has a complicated structure, which does not complicate the assembling process, but also increase costs, especially tightly fitting the ring retainer 43 to the balance shaft 4 causing significant trouble in manufacturing.

Thus, it is desired to provide a mechanism to solve the noise problem in a simple and efficient manner.

SUMMARY OF THE INVENTION

The primary purpose of the present invention is to provide a noise suppressing mechanism for balance gear system of an engine crankshaft, wherein the balance gear system comprises a primary gear, a secondary gear, and a torsional spring and is fit on a balance shaft. The primary gear forms a circular flange and the secondary gear forms a central bore rotatably fit over the circular flange for free rotation of the secondary gear about the circular flange with respect to the primary gear. The torsional spring is arranged between the primary and secondary gears. With such an arrangement, the number of parts for the noise suppressing mechanism is reduced and the assembling process thereof is simplified.

Another objective of the present invention is to provide a noise suppressing mechanism for balance gear system of an engine crankshaft, wherein the balance gear system comprises a primary gear, a secondary gear, and a torsional spring and is fit on a balance shaft. The primary gear forms a circular flange and the secondary gear forms a central bore rotatably fit over the circular flange for free rotation o about the circular flange with respect to the primary gear. The torsional spring is arranged between the primary and secondary gears. The primary gear forms a securing hole. The secondary gear forms a through hole. A limiting pin extends through the through hole of the secondary gear and comprises a stem section received and retained in the securing hole of the primary gear and a head section accommodated in the through hole of the secondary gear with a gap formed between the head section and an inside diameter of the through hole. The gap allows for a limited angular shift of the secondary gear with respect to the primary gear. With such an arrangement, the number of parts for the noise suppressing mechanism is reduced and the assembling process thereof is simplified.

A further objective of the present invention is to provide a noise suppressing mechanism for balance gear system of an engine crankshaft, wherein the balance gear system comprises a primary gear, a secondary gear, and a torsional spring and is fit on a balance shaft. The primary gear forms a circular flange and the secondary gear forms a central bore rotatably fit over the circular flange for free rotation about the circular flange with respect to the primary gear. The torsional spring is arranged between the primary and secondary gears. The circular flange of the primary gear forms a keyway in which a key is received and fixed. A notch is defined in an inside diameter of the central bore of the secondary gear to partially receive the key therein. The notch is sized to form gaps on opposite sides of the key to allow for a limited angular shift of the secondary gear with respect to the primary gear.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
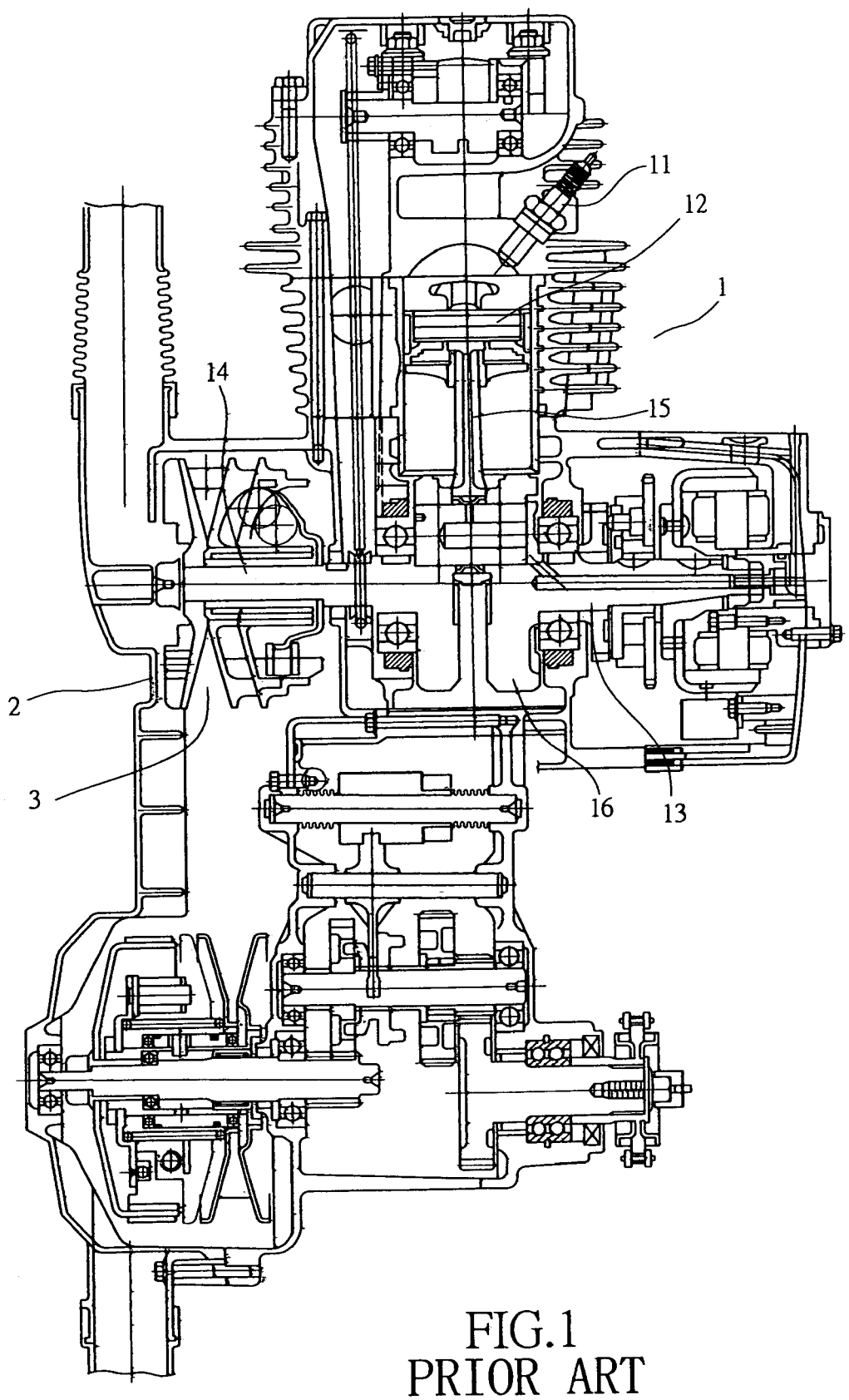
FIG. 1 is a cross-sectional view of a conventional engine.
Figure 2:
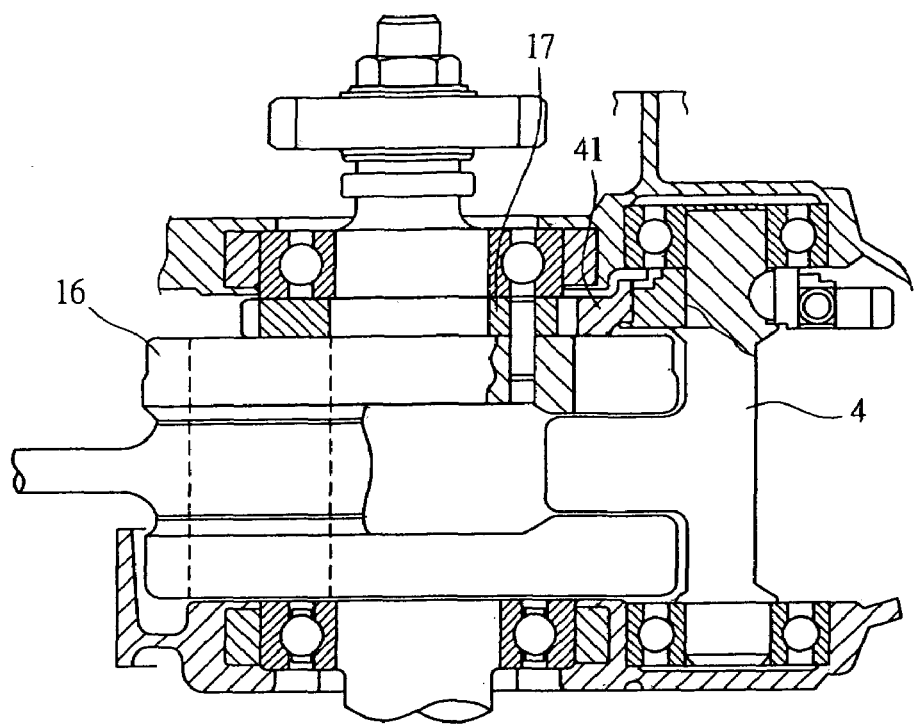
FIG. 2 is a cross-sectional view of a portion of a crankshaft and a portion of a balance shaft of the conventional engine.
Figure 3:
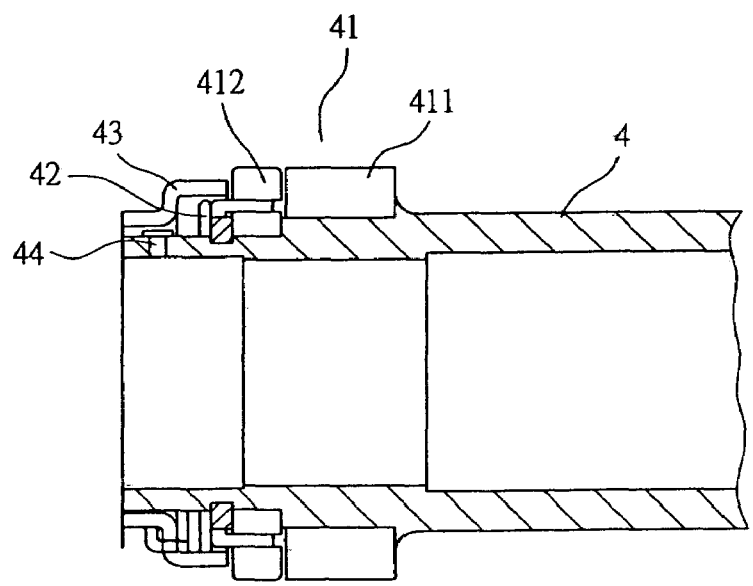
FIG. 3 is a cross-sectional view of a conventional noise suppressing mechanism for the conventional engine.
Figure 4:
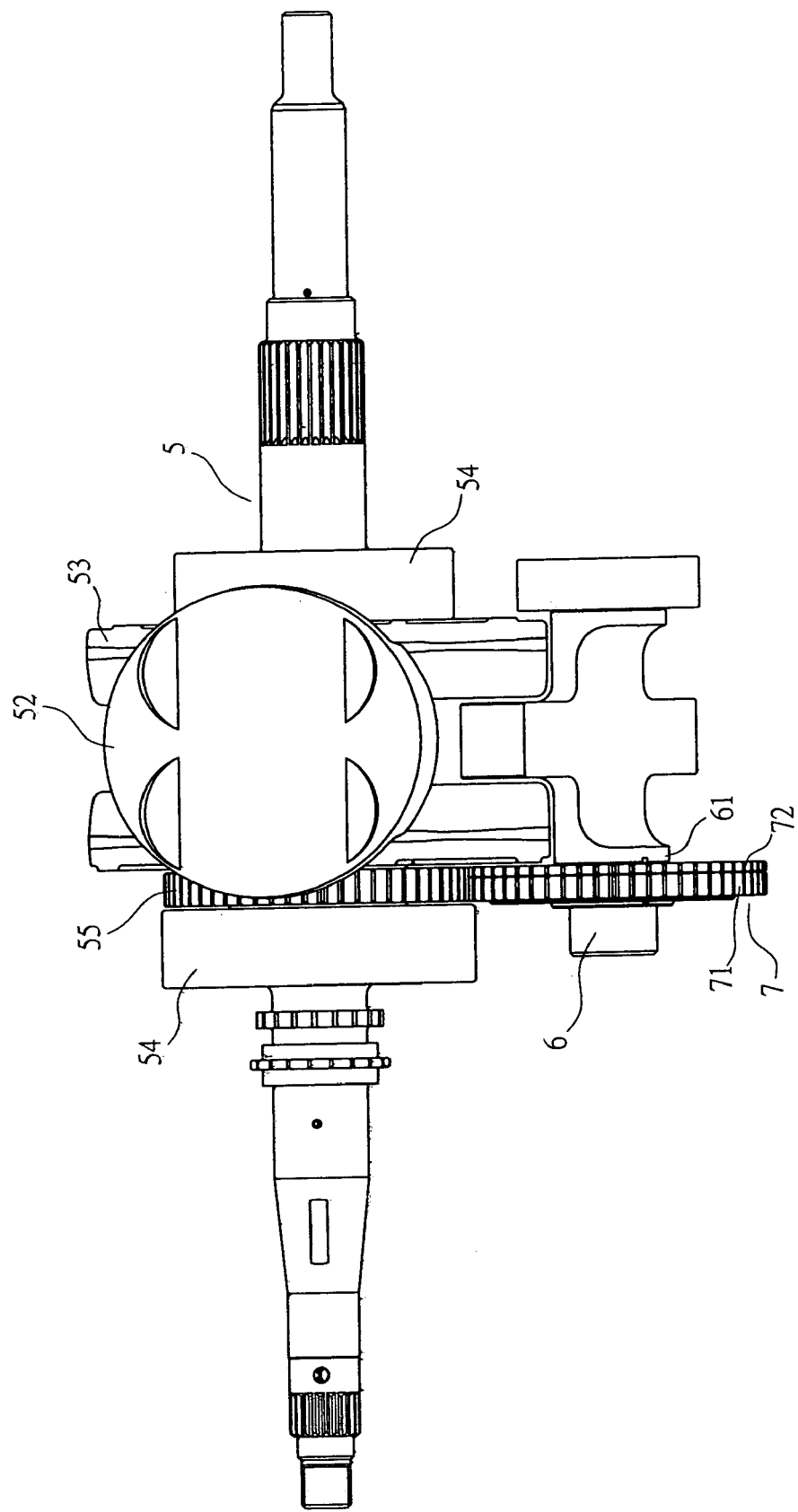
FIG. 4 is a top view of a crankshaft and a balance shaft in accordance with the present invention.
Figure 5:
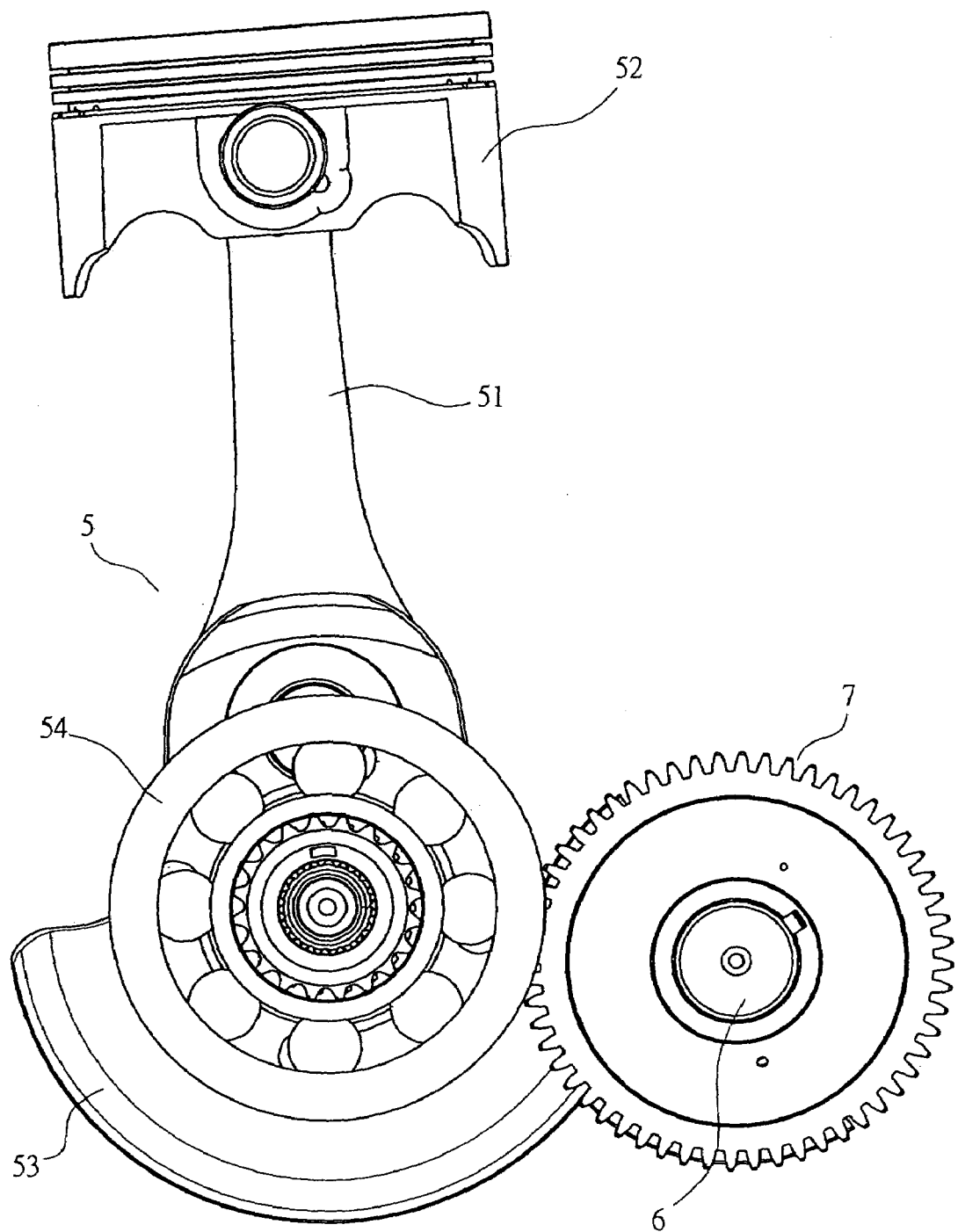
FIG. 5 is a side elevational view of the crankshaft and the balance shaft in accordance with the present invention.

With reference to the drawings and in particular to FIGS. 4 and 5, in an engine in accordance with the present invention, a crankshaft, generally designated with reference numeral 5, is connected to a piston 52 of a cylinder (not shown) of the engine by a connecting rod 51. A counterweight 53 is coupled to a bottom end of the connecting rod 51. Bearings 54 are arranged on the crankshaft 5 on opposite sides of the counterweight 53. A drive gear 55 is arranged between the counterweight 53 and one of the bearings 54. A balance shaft 6 is arranged on one side of and spaced from the crankshaft 5 and extends in a direction substantially parallel to a rotational axis of the crankshaft 5.

Figure 6:
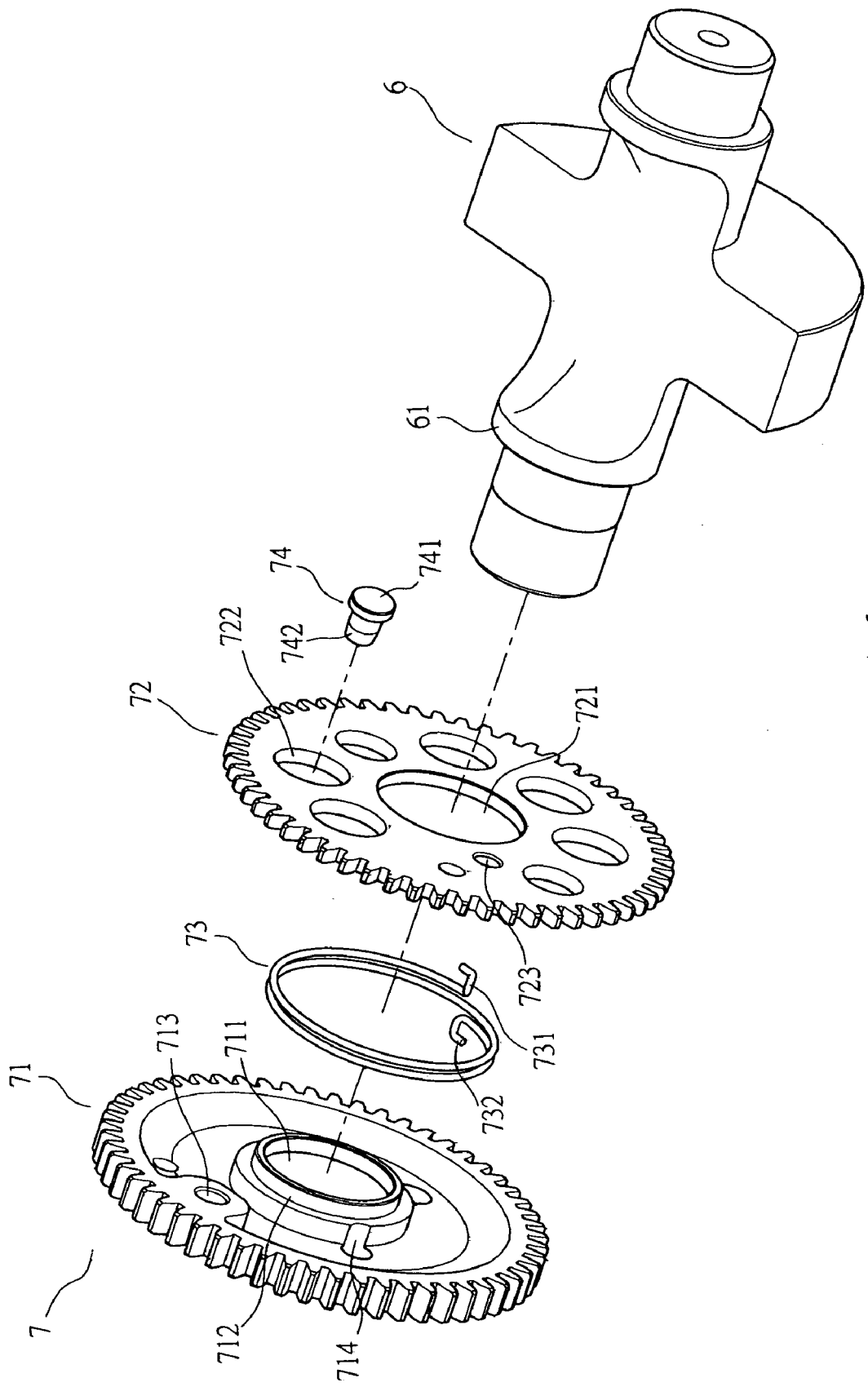
FIG. 6 is an exploded view of the balance shaft and a balance gear system in accordance with the present invention.
Figure 7:
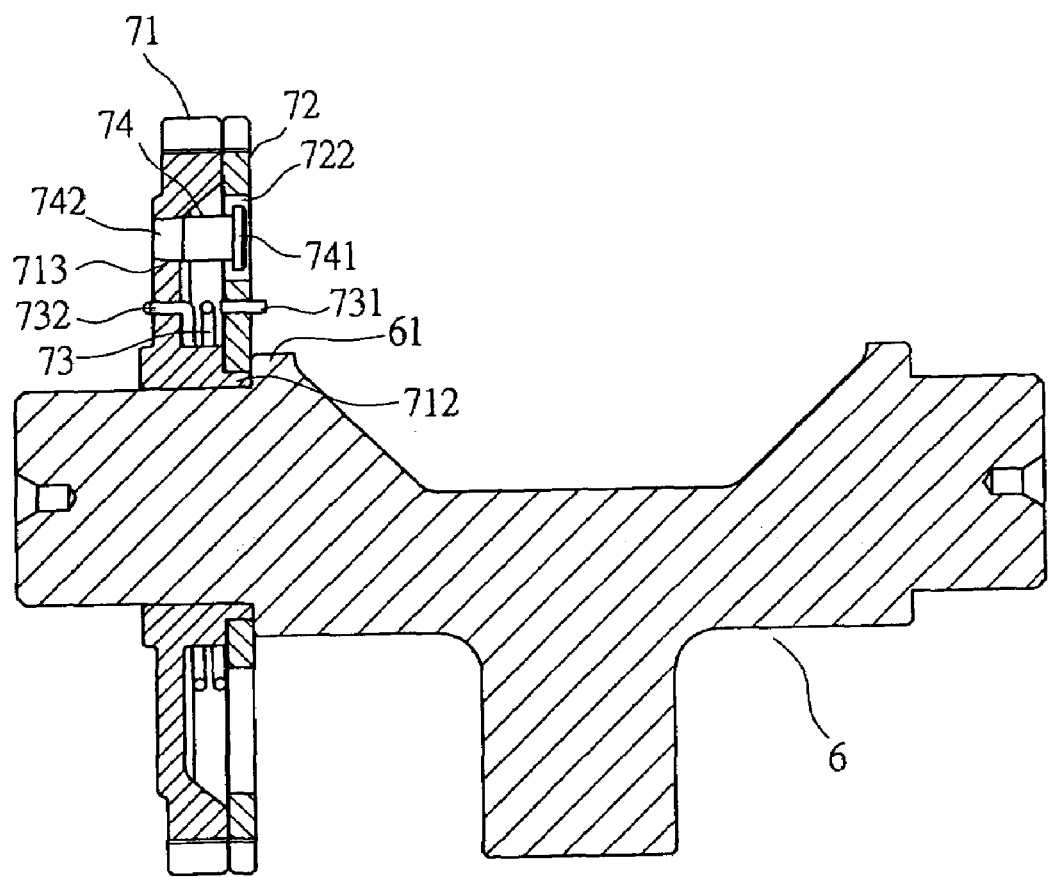
FIG. 7 is a cross-sectional view of the balance shaft and the balance gear system in accordance with the present invention.

A balance gear system 7 is mounted on the balance shaft 6 and corresponds to and engages the drive gear 55 of the crankshaft 5, as particularly shown in FIGS. 6 and 7. The balance gear system 7 comprises a primary gear 71, a secondary gear 72, a torsional spring 73, and a limiting pin 74. The primary gear 71 and the secondary gear 72 are of substantially the same toothed configuration.

The primary gear 71 defines a central bore 711 around which a circumferential circular flange 712 is formed. The primary gear 71 also defines a securing hole 713 and an insertion hole 714.

The secondary gear 72 defines a central bore 721, and also forms a through hole 722 and an insertion hole 723. The central bore 721 of the secondary gear 72 corresponds in position and size to the circumferential flange 712 of the primary gear 71. The through hole 722 of the secondary gear 72 aligns with the securing hole 713 of the primary gear 71 and the insertion hole 723 of the secondary gear 72 aligns with the insertion hole 714 of the primary gear 71.

The torsional spring 73 is formed with two U-shaped ends 731, 732. The U-shaped end 731 is fit into the insertion hole 723 of the secondary gear 72, while the U-shaped end 732 is fit into the insertion hole 714 of the primary gear 71. The U-shaped configuration of the ends 731, 732 helps preventing the torsional spring 73 from inadvertently separating from the gears 71, 72.

The limiting pin 74 comprises a head section 741 and a stem section 742 extending from the head section 741 and having a diameter smaller than that of the head section 742. Also, the diameter of the head section 741 of the limiting pin 74 is smaller than inside diameter of the through hole 722 of the secondary gear 72 whereby a circumferential gap can be maintained between the through hole 722 of the secondary gear 72 and the head section 741 of the limiting pin 74 when the head section 741 of the limiting pin 74 is accommodated in the through hole 722 of the secondary gear 72.

Also referring to FIGS. 6 and 7, the secondary gear 72 is coupled to the primary gear 71 by fitting the central bore 712 of the secondary gear 72 over the circumferential flange 712 of the primary gear 71 to have the primary and secondary gears 71, 72 engaging each other in a face-to-face manner. The secondary gear 72 is fit over the circumferential flange 712 of the primary gear 71 in a sliding fit manner, which allows the secondary gear 72 to be rotatable about the circumferential flange 712 of the primary gear 71. The torsional spring 73, with the U-shaped ends 731, 732 received and fixed in the insertion holes 723, 741 of the secondary gear 72 and the primary gear 71, is interposed between the primary and secondary gears 71, 72.

The limiting pin 74 is positioned into the through hole 722 of the secondary gear 22 with the stem section 742 received and fixed in the securing hole 713 of the primary gear 71 and the head section 741 accommodated in the through hole 722 of the secondary gear 22. This completes the assembling of the balance gear system 7.

The balance gear system 7 so assembled is mounted to the balance shaft 6 by fitting the central bore 71 of the primary gear 71 over the balance shaft 6 in a tight-fitting manner with the secondary gear 72 abutting against a circumferential shoulder or flange 61 formed on the balance shaft 6.

The balance shaft 6 is arranged to mate both the primary and secondary gears 71, 72 of the balance gear system 7 with the drive gear 54 of the crankshaft 5 whereby the rotation of the crankshaft 5 is transmitted, through the engagement of the gears 71, 72 and the drive gear 54, to the balance shaft 6, causing the balance shaft 6 to rotate substantially in unison with the crankshaft 5.

The secondary gear 72 is secured in position on the balance shaft 6 by being retained on opposite sides by the primary gear 71 and the shoulder 61 of the balance-shaft 6 whereby inadvertent separation of the secondary gear 72 from the balance shaft 6 or axial displacement of the secondary gear 72 is effectively eliminated. Further, the torsional spring 73 interposed between the primary and secondary gears 71, 72 induces a torque on the secondary gear 72, which causes relative rotation of the secondary gear 72 with respect to the primary gear 71 so that all angular shift or offset occurs between the teeth of the primary gear 71 and the corresponding teeth of the secondary gear 72 to help eliminating backlash between the gears 71, 72 of the balance gear system 7 and the drive gear 54 of the crankshaft 5. The angular shift or offset between the teeth of the primary and secondary gears 71, 72 is controlled by the torsional spring 73 and is further limited by the limiting pin 74 by the contact engagement between the head section 741 of the limiting pin 74 and the inside diameter of the through hole 722 of the secondary gear 72.

Figure 8:
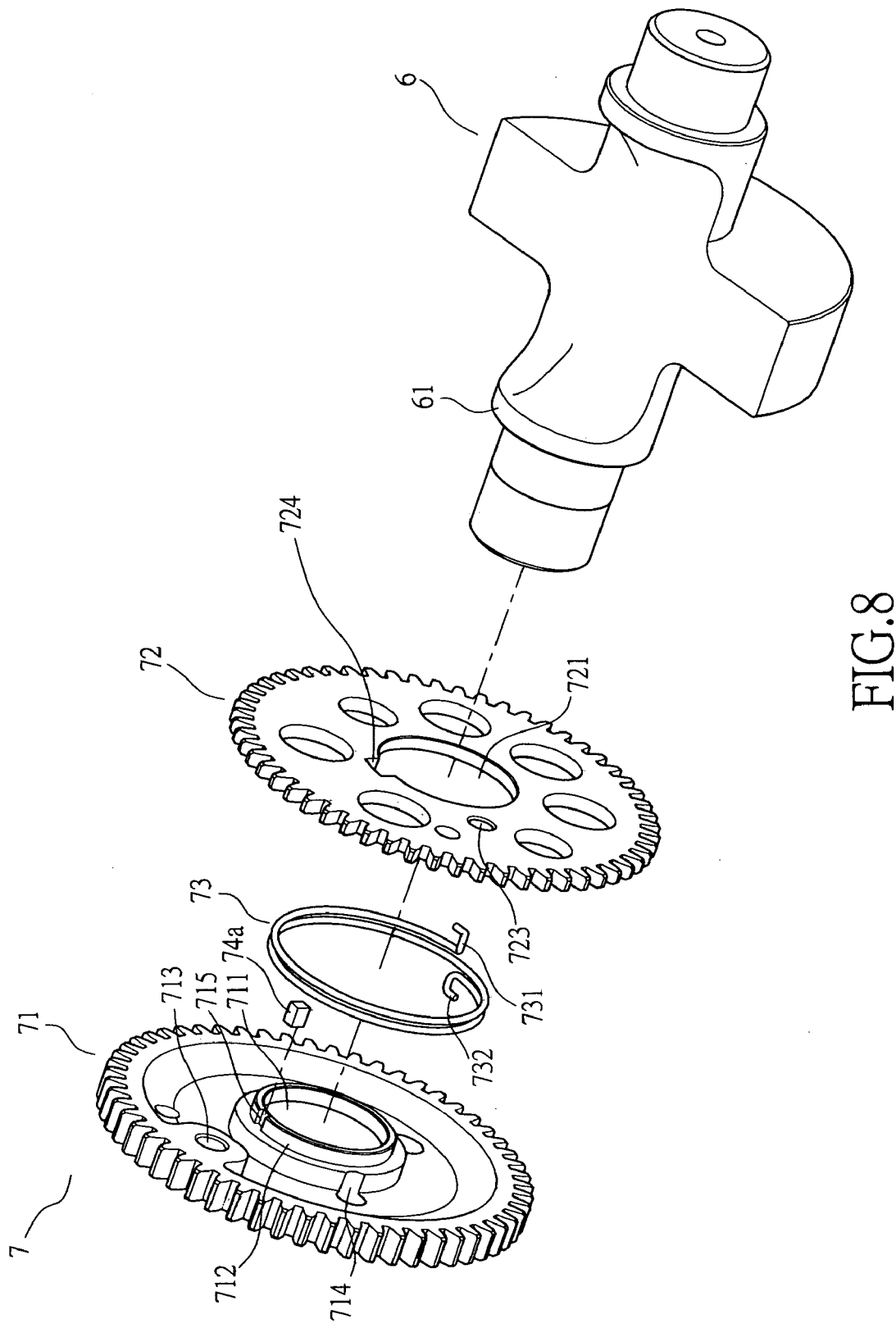
FIG. 8 is an exploded view of a balance shaft and a balance gear system in accordance with another embodiment of the present invention.

Also referring to FIG. 8, a modification of the balance gear system 7 is illustrated. The limiting pin 74 is replaced by a key 74a that is tightly received and thus fixed in a keyway 715 defined in the circumferential flange 712 of the primary gear 71 and partially received in a notch 724 defined in an inner circumference of the central bore 721 of the secondary gear 72. The notch 724 is sized to form gaps between opposite ends of the notch 724 and the key 74a to allow relative rotation (or angular shifting or offset) of the secondary gear 72 with respect to the primary gear 71. The size of the gaps serves as a limit to the rotation or angular shifting of the secondary gear 72 with respect to the primary gear 71.

The feature of the present invention resides in the angular shift or offset of the secondary gear 72 with respect to the primary gear 71 to eliminate the backlash between the primary and second gears 71, 72 of the balance gear system 7 and the drive gear 54 of the crankshaft 5. The elimination of the backlash helps reducing noise generated by impact between teeth of the balance gear system 7 and the drive gear 54 during the rotation of the crankshaft 5. Another feature of the present invention is the limiting pin 74 or key 74a that limits the angular shift or offset of the secondary gear 72 with respect to the primary gear 71 so as to prevent over-shift of the secondary gear 72 with respect to the drive gear 54, which may damage parts of the balance gear system 7, such as damage of the torsional spring 73 due to over-loading.

Although the present invention has been described with reference to what is believed to be the preferred embodiments of the present invention, it is apparent to those skilled in the art that a variety of modifications and changes may be made without departing from the scope of the present invention which is intended to be defined by the appended claims It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In an engine having a crankshaft, a piston connected to said crankshaft by a connecting rod, a counterweight coupled to an end of said connecting rod, two bearings arranged on said crankshaft on two opposite sides of said counterweight, a drive gear arranged between said counterweight and one of said bearings, a balance shaft arranged on one side and spaced from said crankshaft and extending in a direction parallel to a rotational axis of said crankshaft, the improvement wherein said balance gear system is mounted on said balance shaft and is engaged with said drive gear, said balance gear system comprising a primary gear, a secondary gear, a torsional spring and a limiting pin, said primary gear having a securing hole, a first insertion hole, and a first central bore around which a circumferential circular flange is formed, said second gear having a through hole, a second insertion hole, and a second central bore, said securing hole, said first insertion hole and said first central bore of said primary gear being aligned with said through hole, said second insertion hole, and said second central bore of said secondary gear respectively, said torsional spring being formed with a first and a second U-shaped ends, said first U-shaped end being fit into said first insertion hole, said second U-shaped end being fit into said second insertion hole, said limiting pin having a head section and a stem section extending from said head section and having a diameter smaller than a diameter of said head section, said head section of said limiting pin being fit into said through hole of said secondary gear, said diameter of said head section being smaller than a diameter of said through hole of said secondary gear thereby forming a gap between said head section of said limiting pin and said through hole of said secondary gear, said secondary gear being coupled to said primary gear by fitting said second central bore of said secondary gear over said circumferential circular flange of said primary gear to having said primary and secondary gears engaging each other in a face-to-face manner, said secondary gear being fit over said circumferential circular flange of said primary gear in a sliding fit manner thereby allowing said secondary gear to be rotatable about said circumferential circular flange of said primary gear, said central bore of said primary gear being fitted over said balance shaft in a tight-fitting manner with said secondary gear abutting against a circumferential shoulder formed on said balance shaft, said balance shaft being arranged to mate both said primary and secondary gears with said drive gear thereby causing said balance shaft to be rotated in unison with said crankshaft.

2. The balance gear system as claimed in claim 1, wherein said secondary gear is secured in position on said balance shaft by being retained on opposite sides by said primary gear and said circumferential shoulder of said balance shaft.

3. The balance gear system as claimed in claim 1, wherein said torsional spring interposed between said primary and secondary gears includes a torque on said secondary gear thereby causing relative rotation of said secondary gear with respect to said primary gear so that an angular shift or offset occurs between teeth of said primary gear and corresponding teeth of said secondary gear to help eliminating backlash between said primary and secondary gears of said balance gear system and said drive gear.

4. In an engine having a crankshaft, a piston connected to said crankshaft by a connecting rod, a counterweight coupled to an end of said connecting rod, two bearings arranged on said crankshaft on two opposite sides of said counterweight, a drive gear arranged between said counterweight and one of said bearings, a balance shaft arranged on one side and spaced from said crankshaft and extending in a direction parallel to a rotational axis of said crankshaft, the improvement wherein said balance gear system is mounted on said balance shaft and is engaged with said drive gear, said balance gear system comprising a primary gear, a secondary gear, a torsional spring, and a key, said primary gear having a first insertion hole, and a first central bore around which a circumferential circular flange is formed, said second gear having a second insertion hole, and a second central bore, said first insertion hole and said first central bore of said primary gear being aligned with said second insertion hole and said second central bore of said secondary gear respectively, said torsional spring being formed with a first and a second U-shaped ends, said first U-shaped end being fit into said first insertion hole, said second U-shaped end being fit into said second insertion hole, an inner circumference of said second central bore being formed with a notch, said circumferential circular flange being formed a keyway partially received in said notch, said notch being sized to form gaps between opposite ends of said notch and said key to allow relative rotation of said secondary gear with respect to said primary gear, said secondary gear being coupled to said primary gear by fitting said second central bore of said secondary gear over said circumferential circular flange of said primary gear to having said primary and secondary gears engaging each other in a face-to-face manner, said secondary gear being fit over said circumferential circular flange of said primary gear in a sliding fit manner thereby allowing said secondary gear to be rotatable about said circumferential circular flange of said primary gear, said central bore of said primary gear being fitted over said balance shaft in a tight-fitting manner with said secondary gear abutting against a circumferential shoulder formed on said balance shaft, said balance shaft being arranged to mate both said primary and secondary gears with said drive gear thereby causing said balance shaft to be rotated in unison with said crankshaft.

5. The balance gear system as claimed in claim 4, wherein said secondary gear is secured in position on said balance shaft by being retained on opposite sides by said primary gear and said circumferential shoulder of said balance shaft.

6. The balance gear system as claimed in claim 4, wherein said torsional spring interposed between said primary and secondary gears includes a torque on said secondary gear thereby causing relative rotation of said secondary gear with respect to said primary gear so that an angular shift or offset occurs between teeth of said primary gear and corresponding teeth of said secondary gear to help eliminating backlash between said primary and secondary gears of said balance gear system and said drive gear.

* * * * *